United States Patent
Fujisaki et al.

(10) Patent No.: US 8,673,026 B2
(45) Date of Patent: Mar. 18, 2014

(54) ASSEMBLED BATTERY MANUFACTURING METHOD

(75) Inventors: Sadao Fujisaki, Anjo (JP); Koji Oshita, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/258,001

(22) PCT Filed: Mar. 26, 2010

(86) PCT No.: PCT/JP2010/055309
§ 371 (c)(1),
(2), (4) Date: Sep. 21, 2011

(87) PCT Pub. No.: WO2011/118015
PCT Pub. Date: Sep. 29, 2011

(65) Prior Publication Data
US 2013/0000109 A1    Jan. 3, 2013

(51) Int. Cl.
*H01M 4/82* (2006.01)
*H01M 6/00* (2006.01)
*H02J 7/00* (2006.01)

(52) U.S. Cl.
USPC .......... 29/623.1; 320/118; 320/127; 320/128; 320/132; 320/137

(58) Field of Classification Search
USPC ......... 29/623.1; 320/116, 118, 127–130, 132, 320/135, 137
See application file for complete search history.

(56) References Cited

U.S. PATENT DOCUMENTS

| | | | | |
|---|---|---|---|---|
| 5,252,906 A * | 10/1993 | Busson | | 320/132 |
| 6,828,757 B2 * | 12/2004 | Furukawa | | 320/116 |
| 7,180,267 B2 * | 2/2007 | Nakada | | 320/132 |
| 7,494,729 B2 * | 2/2009 | Odaohhara | | 429/9 |
| 2009/0325057 A1 * | 12/2009 | Kim et al. | | 429/131 |
| 2010/0019727 A1 * | 1/2010 | Karden et al. | | 320/129 |
| 2010/0047684 A1 * | 2/2010 | Okumura et al. | | 429/156 |
| 2010/0085009 A1 * | 4/2010 | Kang et al. | | 320/118 |

FOREIGN PATENT DOCUMENTS

| | | |
|---|---|---|
| CN | 101635471 | 1/2010 |
| JP | 2006-324163 | 11/2006 |
| JP | 2008-293703 | 12/2008 |
| JP | 2009-43736 | 2/2009 |
| WO | WO 2008146587 A1 * | 12/2008 |

* cited by examiner

*Primary Examiner* — Carlos Barcena
(74) *Attorney, Agent, or Firm* — Finnegan, Henderson, Farabow, Garrett & Dunner, LLP

(57) ABSTRACT

Cells (1) are first manufactured (S01). Each cell (1) is inspected (S02) and then adjusted to SOC 40% (S03). Thereafter, the cells (1) are assembled to form a cell stack (90) (S04). In the cell stack (90), the cells (1) constituting the cell stack (90) are collectively discharged so that their SOC becomes 30% (S05). This collective discharge is performed to collectively discharge the cells (1) in the cell stack (90). Thus, the same discharging conditions (equipment, time, environment, etc.) are established for the cells (1).

16 Claims, 11 Drawing Sheets

PRIOR ART

ASSEMBLED BATTERY MANUFACTURING METHOD

CROSS-REFERENCE TO RELATED APPLICATIONS

This is a national phase application based on the PCT International Patent Application No. PCT/JP2010/055309 filed on Mar. 26, 2010, the entire contents of which are incorporated herein by reference.

TECHNICAL FIELD

The present invention relates to a method of manufacturing an assembled battery having a plurality of cells.

BACKGROUND ART

In recent years, secondary batteries such as lithium ion batteries are receiving increased attention not only as power sources for portable personal computers and cellular phones but also as vehicle power sources for hybrid cars and electric vehicles. In these secondary batteries such as lithium ion batteries, a plurality of electric cells (cells) are connected in series, thereby forming an assembled battery to provide desired output voltage.

In order that an assembled battery properly exhibits its performance, the constituent cells of the assembled battery have to function normally. To this end, the cells are respectively subjected to inspection before they are incorporated as an assembled battery. With a view to ensuring safety required for storage and delivery, the state of charge (SOC) of each inspected cell is adjusted to a value proximate to a minimum applicable percentage by discharging.

FIG. 11 shows a conventional process for manufacturing an assembled battery. In this process, cells are first produced (Step S11). Then, the cells are respectively adjusted to a specified SOC and subjected to inspection (Step S12). The cells, which have passed the inspection, are subsequently discharged so that their SOC becomes a minimum applicable percentage (30% in this process) (Step S13). Thereafter, the cells, which have been discharged, are assembled, thereby forming a cell stack (Step S14). Then, the constituent cells of the cell stack are electrically connected in series thereby to form an assembled battery (Step S16).

There are known other techniques in which the constituent cells of the cell stack are further inspected subsequently to the formation of the cell stack. In the assembled battery manufacturing method disclosed in Patent Document 1 for example, the SOC of each individual cell is firstly adjusted to a value lower than the minimum applicable percentage and then an inspection is conducted on the cell. Thereafter, the inspected cells are assembled and the assembled cells are then charged until their SOC becomes equal to an intermediate applicable value. In this condition, the cells are respectively inspected again. Subsequently, the cells assembled as an assembled battery are subjected to inspection.

RELATED ART DOCUMENTS

Patent Documents

Patent Document: JP2006-324163A

DISCLOSURE OF THE INVENTION

Problems to be Solved by the Invention

The above conventional assembled battery manufacturing process, however, has revealed the following problem. More specifically, the cells, which have been discharged, vary in voltage owing to the individual difference (the difference in internal resistance) between the cells, the difference in the discharging equipment employed, the difference in environmental conditions such as temperature and humidity, the difference in the time elapsed after the discharging, and others. The variations in voltage between the cells are one of the factors that deteriorate the performance of the assembled battery.

This variations in voltage after the discharge are expected to be reduced by charging all the cells under the same conditions (equipment, environmental conditions, time, etc.) after assembling the cells as disclosed in Patent Document 1. However, a power source is needed to perform the charge and moreover, the system itself is costly. In addition, it is objectionable in view of the safety aspect to store or deliver the constituent cells of a cell stack in a high SOC state.

The invention is directed to overcoming the foregoing problems presented by the above-described previous techniques. That is, an object of the invention is to provide a method of manufacturing an assembled battery in which variations in voltage between the constituent cells are safely reduced.

Means of Solving the Problems

To achieve the above object, the present invention provides a method of manufacturing an assembled battery including a plurality of cells, the method comprising: a first adjustment step for adjusting charging rates of the cells to a first charging rate; an assembling step for assembling the plurality of cells, the charging rates of which have been adjusted to the first charging rate, such that the cells constitute an electrically unconnected cell stack; and a second adjustment step for collectively discharging at least two constituent cells of the cell stack such that their charging rates become equal to a second charging rate that is lower than the first charging rate.

According to the above-described assembled battery manufacturing method, after the charging rates of the cells are once adjusted to the first charging rate, the cells after the adjustment are assembled into a cell stack. Then, the plurality of cells that constitute the cell stack are collectively discharged while being in the stacked condition, so that their charging rates become equal to the second charging rate. By thus collectively discharging the plurality of cells in the form of the cell stack, the same discharging conditions (equipment, time, environment etc.) can be attained for the constituent cells of the cell stack. In consequence, the variations in voltage between the constituent cells of the cell stack can be reduced. In the invention, since the voltages of the cells are equalized by discharging, there is no need to provide a power source used for charging to the system for processing the cell stack after assembling. In addition, since the respective charging rates of the cells are all adjusted to the second charging rate lower than the first charging rate, safety can be ensured during storage and delivery.

In the above manufacturing method, the second adjustment step may include collectively discharging all the constituent cells of the cell stack such that their charging rates become equal to the second charging rate.

In the assembled battery, it is desirable to collectively discharge all the cells because the voltages of all the cells can be equalized.

In the above manufacturing method, the second charging rate may be the lower limit of an applicable range for the cells.

That is, it is most preferable in the light of safety that the second charging rate which is the charging rate after the collective discharge is the lower limit of the applicable range. The lower limit of the applicable range (minimum applicable percentage) stated herein is not necessarily determined in a strict sense but may be greater than the exact minimum applicable percentage as long as it is proximate thereto. For instance, it may be set to a value slightly greater than the minimum applicable percentage, taking account of the fact that voltage drops owing to self-discharge.

In addition, in the above-described manufacturing method, an amount of a change in voltage caused by the discharge at the second adjustment step may be greater than an amount of variations in voltage between the cells before the discharge. It can be expected to achieve an effective reduction in the amount of the variations in voltage by making the amount of the change in voltage caused by the collective discharge greater than the amount of the variations in voltage before the discharge. Preferably, an amount of a change in voltage caused by the discharge at the second adjustment step is greater than a value obtained by adding an amount of a change in voltage that appears just after the formation of the cell stack at the assembling step. Preferably, an amount of a change in voltage caused by the discharge at the second adjustment step is greater than a value obtained by further adding an amount of variations in voltage after the collective discharge of the cells.

Effects of the Invention

The invention can provide a method of manufacturing an assembled battery in which variations in voltage between constituent cells are safely reduced.

MODE FOR CARRYING OUT THE INVENTION

Referring now to the accompanying drawings, the invention will be described in detail according to an embodiment thereof. It should be noted that, in the embodiment described herein, the invention is applied to a method of manufacturing a lithium ion assembled battery for use in hybrid cars etc.

[Configuration of Assembled Battery]

Figure 1:
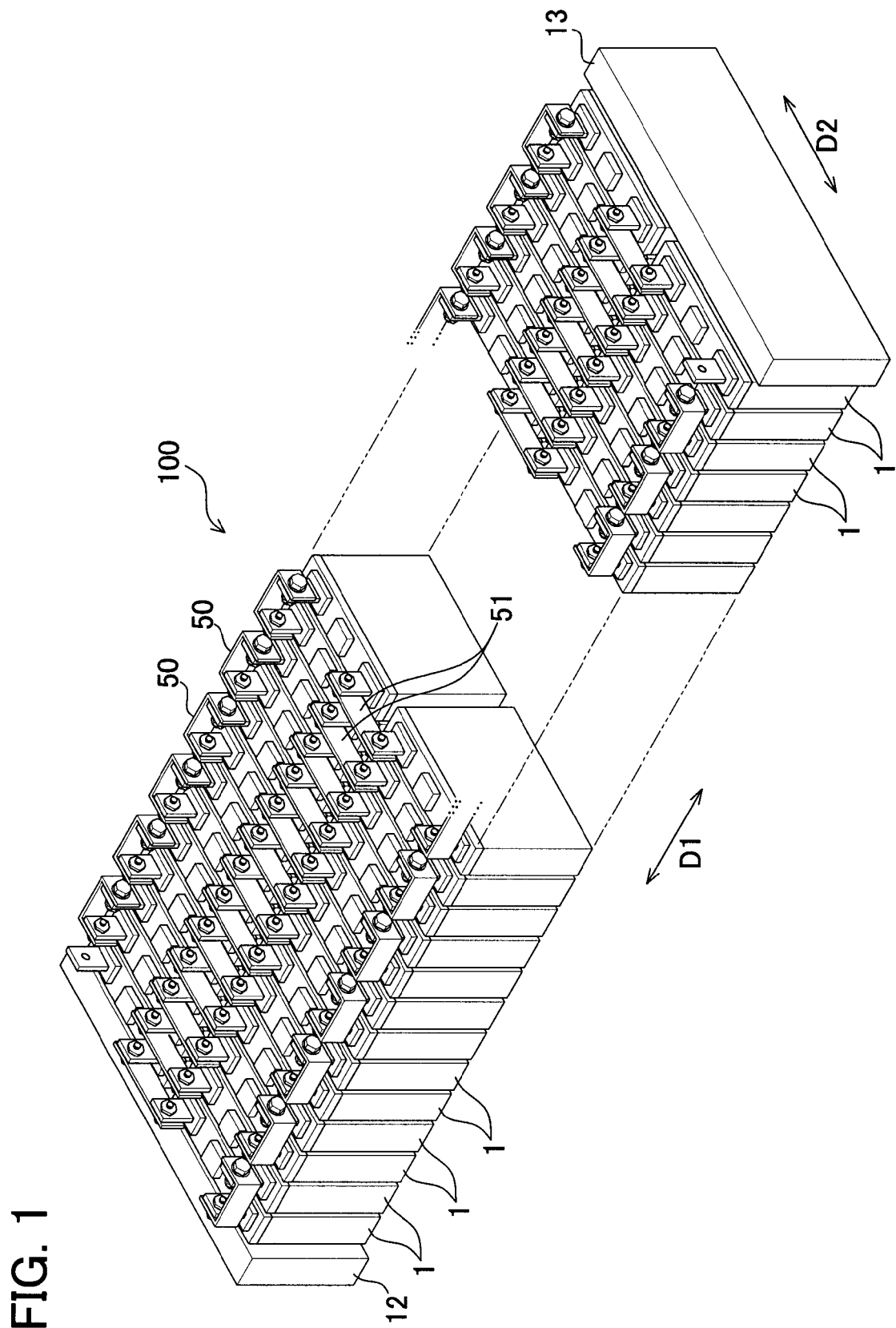
FIG. 1 is a perspective view of an assembled battery of an embodiment.

First, an assembled battery 100 of this embodiment is explained referring to FIG. 1. The assembled battery 100 of this embodiment has a plurality of cells 1 and two end plates (a first end plate 12 and a second end plate 13) which are metal plates.

The first end plate 12 and the second end plate 13 are placed at both ends, respectively, of the assembled battery 100 with respect to the stacking direction (indicated by arrow D1 in FIG. 1) of the plurality of cells 1 so as to prevent the dimension of the cells 1 from varying with respect to the stacking direction. For instance, the first end plate 12 and the second end plate 13 cooperatively hold the cells 1 stacked in the stacking direction D1 under a specified pressure, using a plurality of bar-like bolts (not shown) that pass through the first and second end plates 12, 13 themselves in the stacking direction D1, whereby the variation in the dimension is prevented.

In the assembled battery 100, the cells 1 are arranged in two rows, the cells 1 in each row being stacked in the stacking direction D1 between the first end plate 12 and the second end plate 13. Every adjacent cells 1 are connected to each other in series by bus bars made of copper (the groove-like bus bar for connecting every adjacent cells 1 aligned in the stacking direction D1 of the cells 1 is called "bus bar 50", whereas the plain-plate-like bus bar for connecting every adjacent cells 1 aligned in the row direction D2 in which the cells 1 are rowed is called "bus bar 51").

[Configuration of Cells]

Figure 2:
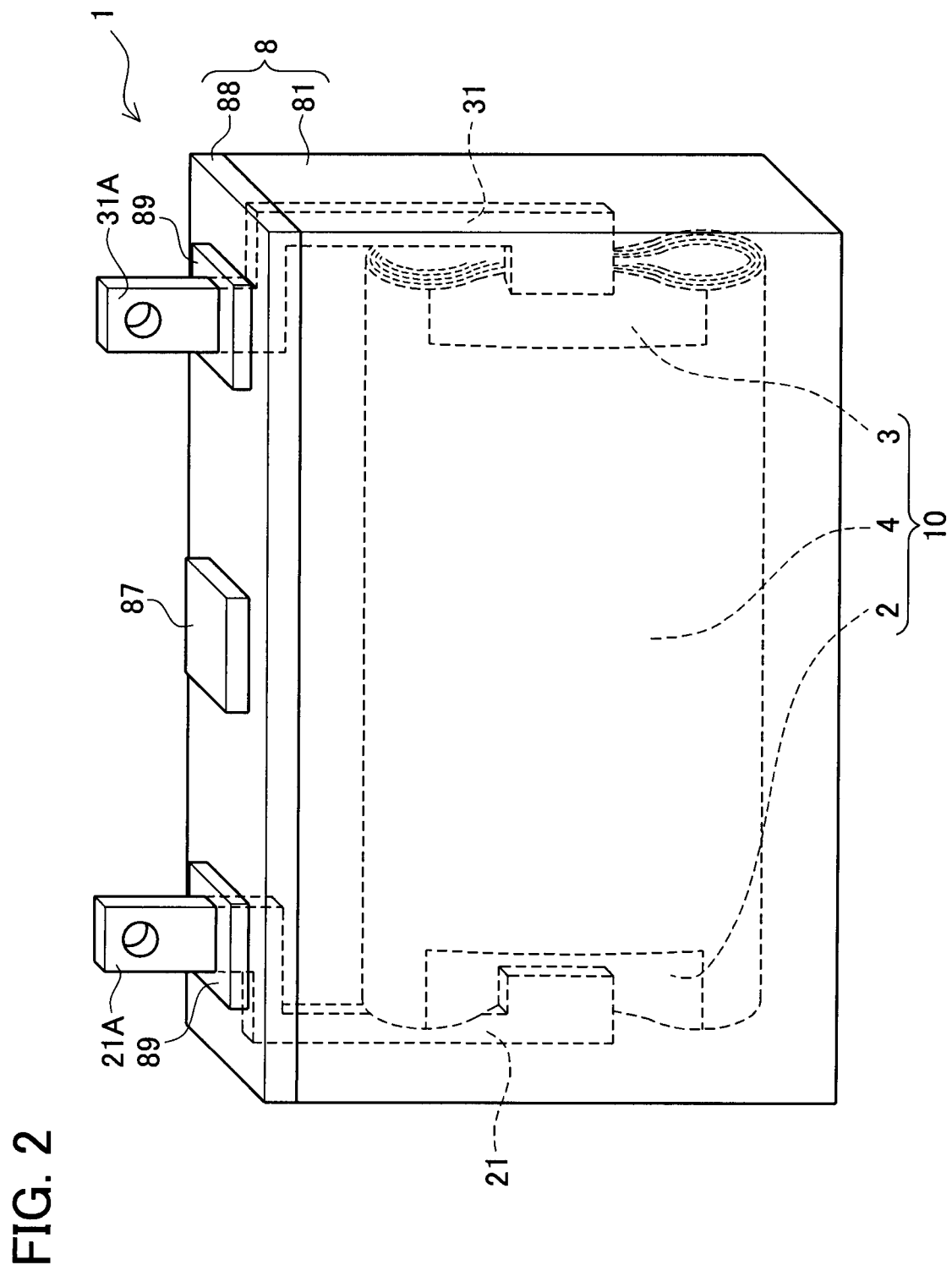
FIG. 2 is a perspective view of a cell of the embodiment.

Next, reference is made to FIG. 2 to describe the cells 1 that constitute the assembled battery 100 of this embodiment. The cells 1 are lithium ion secondary cells each having a power generating element 10 and a battery case 8. The power generating element 10 is composed of a positive electrode plate 2, a negative electrode plate 3 and a separator 4 which are all in the form of a strip and wound up in an overlapped fashion, whereas the battery case 8 houses the power generating element 10.

Of the power generating element 10, the positive electrode plate 2 carries positive active material layers (not shown) laid over both surfaces, respectively, of a strip-like aluminum foil. The positive active material layers contain, for example, lithium nickel oxide ($LiNiO_2$) used as a positive active material, acetylene black used as a conducting material, polytetrafluoroethylene (PTFE) used as a binder and carboxymethyl cellulose (CMC). The negative electrode plate 3 carries negative active material layers (not shown) laid over both surfaces, respectively, of a strip-like copper foil. The negative active material layers contain, for example, graphite and a binder. The electrolyte (not shown) is an organic electrolyte which is prepared by adding lithium hexafluorophosphate ($LiPF_6$) used as a solute to a mixed organic solvent such that lithium ions are contained in a concentration of 1 mol/l, the mixed organic solvent being prepared by mixing ethylene carbonate (EC) and ethyl methyl carbonate (EMC) at an EC to EMC volume ratio of 3:7. The above-noted materials of the positive electrode plate 2, the positive active material layers, the negative electrode plate 3, the negative active material layers and the electrolyte are illustrative only and other materials generally used for lithium ion batteries may be properly selectively used.

The battery case 8 of each cell 1 has a battery case body 81 and a sealing lid 88 which are both made from aluminum. Interposed between the battery case 8 and the power generating element 10 is an insulating member (not shown) such as an insulating film that is used for establishing electric insulation between them. The sealing lid 88 is welded to the battery case body 81 so as to close the opening of the battery case body 81. A positive terminal 21A and a negative terminal 31A are located on the leading ends, respectively, of a positive current collector 21 and a negative current corrector 31 which are connected to the power generating element 10. These terminals 21A and 31A pass through the sealing lid 88, projecting from the sealing lid 88 in FIG. 2. Further, an insulating member 89 made from insulating resin is interposed between the positive terminal 21A and the sealing lid 88 and between the negative terminal 31A and the sealing lid 88 so that electric insulation is established between the terminals 21A, 31A and the sealing lid 88. Further, the sealing lid 88 is provided with a safety valve 87 attached thereto in a sealing manner.

Figure 3:
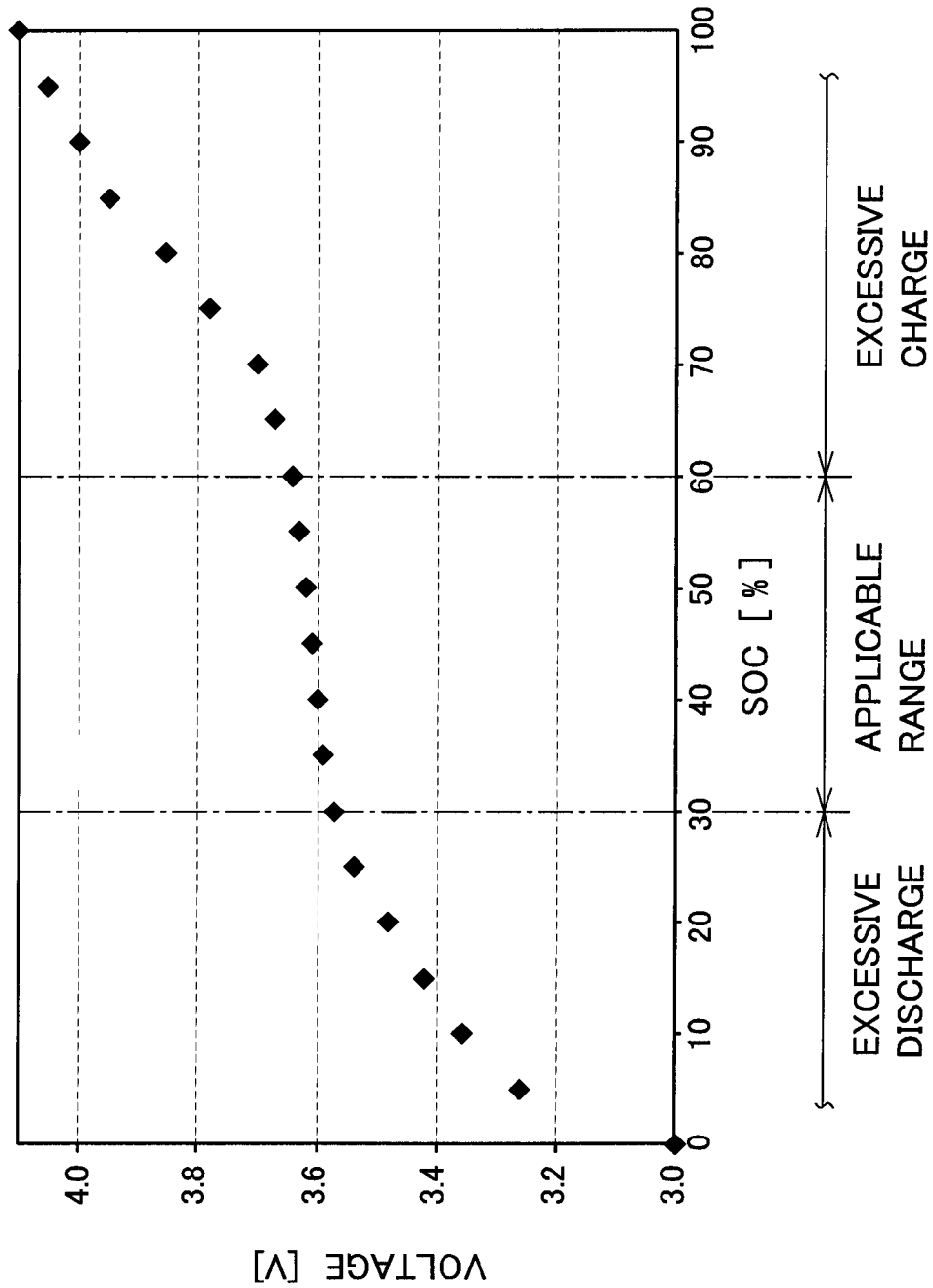
FIG. 3 is a graph showing a relationship between the cell and a charging rate (SOC) in the embodiment.

FIG. 3 shows the relationship between the state of charge (SOC) and voltage of the cells 1 which are lithium ion secondary cells. The voltage of the cells 1 does not vary significantly and is maintained at a substantially constant value (about 3.6V in this embodiment) when the SOC of the cells 1 is within the range of from 30% to 60%. When the SOC is in a state lower than 30% (i.e., over discharge state), the voltage rapidly drops so that necessary battery output cannot be obtained. If the cells 1 are left to stand in the over discharge state where their SOC is not higher than 30%, cobalt existing on the side of the positive electrode and copper existing on the side of the negative electrode start to dissolve so that the function of the cells 1 as second batteries significantly deteriorates. If the SOC comes into a state higher than 60% (i.e., overcharge state), the voltage rapidly rises so that the battery output becomes unstable. That is, the over discharge state where the SOC is lower than 30% and the overcharge state where the SOC is 60% or more are undesirable. Therefore, a minimum applicable value (30% in this embodiment) and a maximum applicable value (60% in this embodiment) are determined for the SOC of the cells 1, and control is performed such that the SOC falls within this range when the cells 1 are in use.

[Manufacturing Procedure for Assembled Battery]

Figure 4:
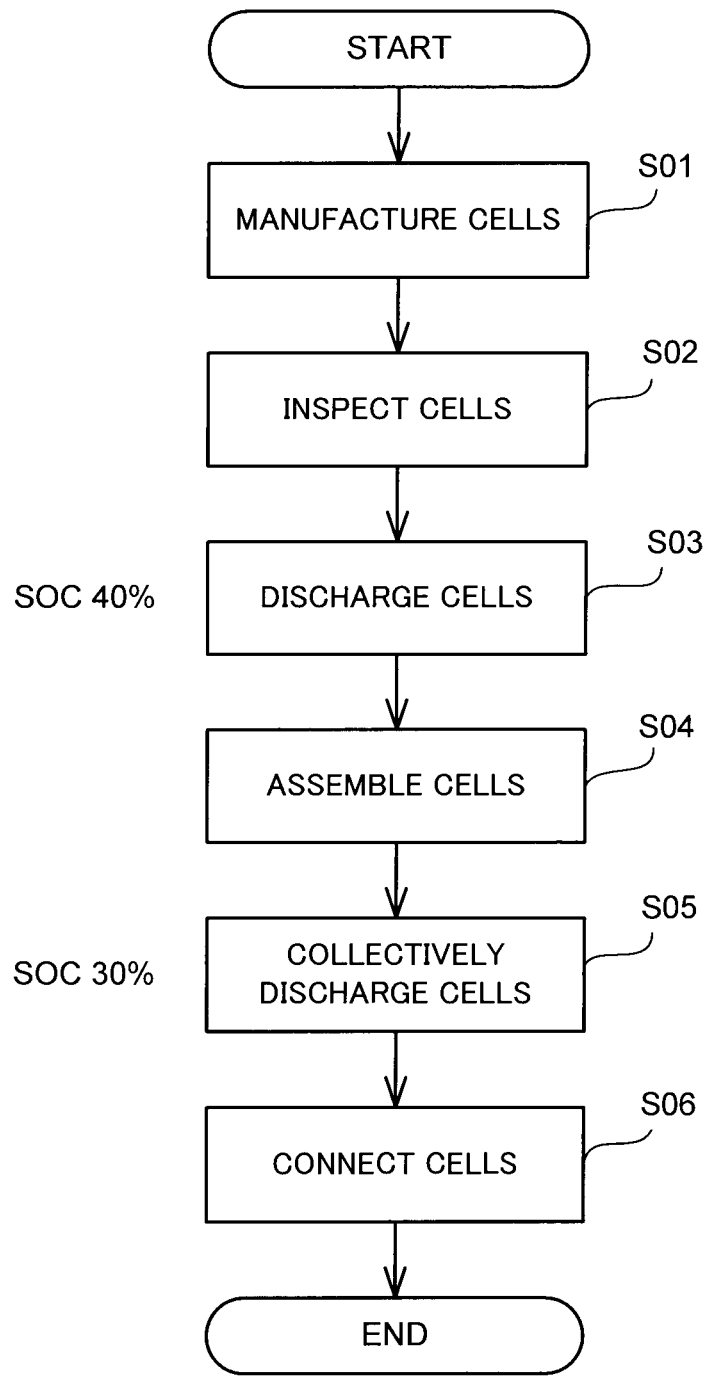
FIG. 4 is a flowchart showing a manufacturing procedure for the assembled battery of the embodiment.

Next, reference is made to FIG. 4 to describe a manufacturing procedure for the assembled battery 100.

First, the cells 1 are produced (Step S01). Then, an inspection is conducted on the cells 1 (Step S02). In the inspection conducted on the cells 1, the SOC is adjusted to, for example, the intermediate value (45% in this embodiment) of the applicable range. Known techniques can be used for the production of Step S01 and the inspection of Step S02.

Figure 5:
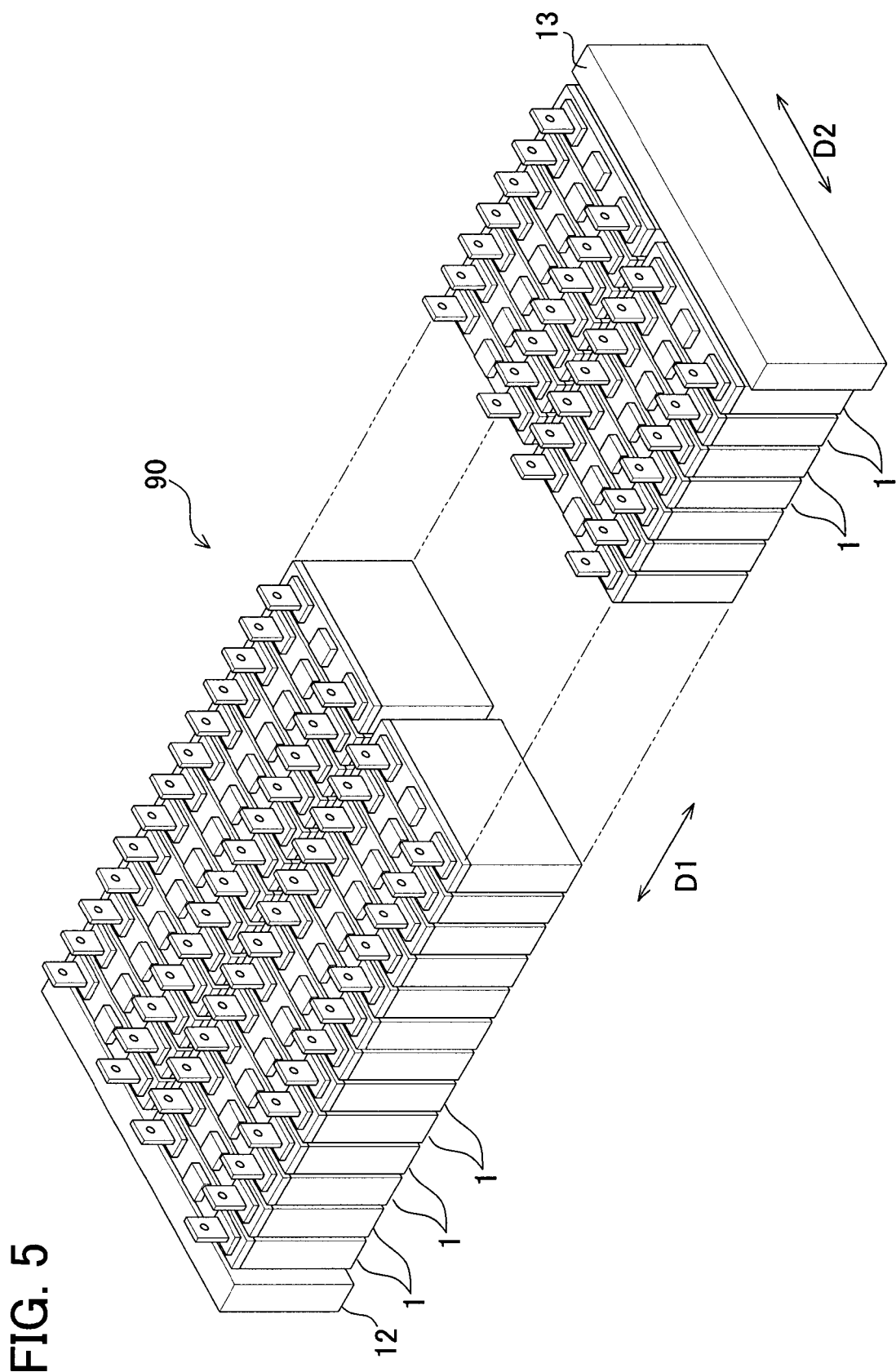
FIG. 5 is a perspective view of a cell stack of the embodiment.

After the inspection of the cells 1 in the Step S02, the cells 1 are adjusted by discharging such that their SOC becomes 40% (Step S03). Then, the cells 1, which have been discharged, are assembled as a cell stack (Step S04). FIG. 5 shows a cell stack 90 formed by assembling the cells 1 in Step S04. In the cell stack 90, the cells 1 are not connected by the bus bars 50, 51 (see FIG. 1) yet so that the cells 1 are electrically unconnected.

Figure 6:
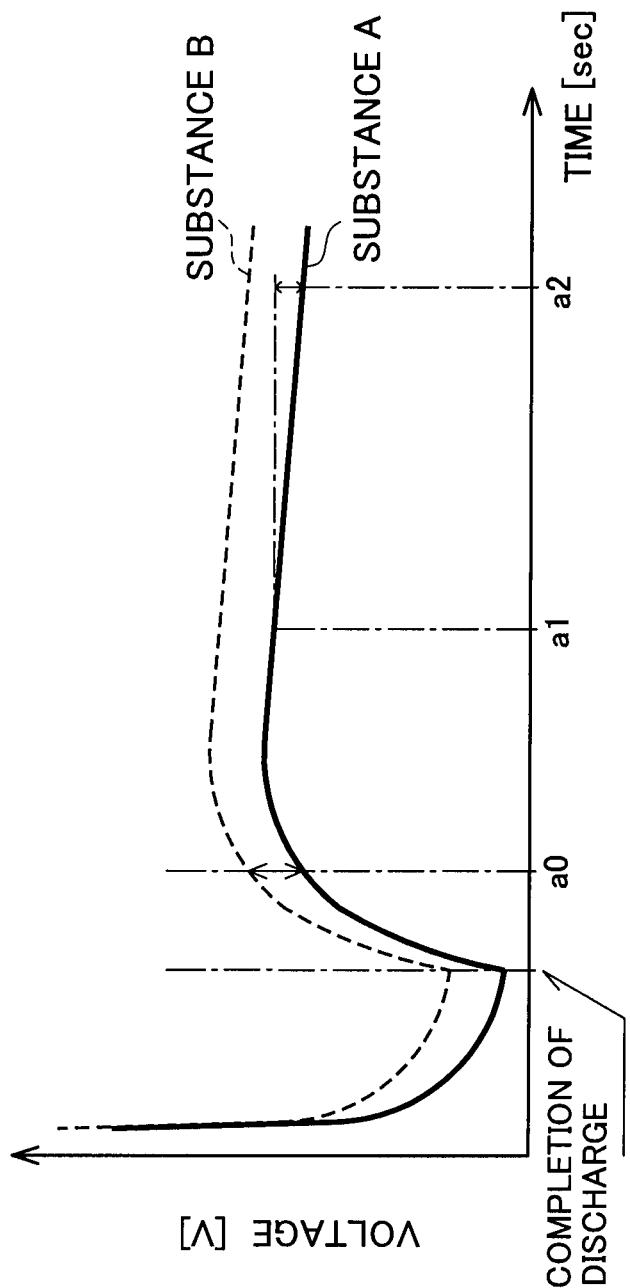
FIG. 6 is a graph showing a voltage transition after discharging the cell of the embodiment.

When measuring the voltage of the cells 1 assembled as the cell stack 90, it is found that there are variations in the voltage values. There are some reasons for the variations in the voltage values. The variations in the voltage values will be explained with reference to the graph of FIG. 6. FIG. 6 shows a voltage transition after discharging the cells 1. After starting the discharge of the cells 1 with a discharge device, the voltage values of the cells 1 decrease. After disconnecting the positive terminals 21A and the negative terminals 31A of the cells 1 from the contactors of the discharge device upon completion of the discharge, resistance such as the wiring resistance of the discharge device disappears, causing a rise in the voltage values. Then, the voltage values stabilize at specified values. Thereafter, the voltage values decrease gradually with time owing to self-discharge.

One reason for the variations in the voltage values of the cells 1 after the discharge relates to the time elapsed after completion of the discharge. If the elapsed time varies, the amount of decrease in voltage varies. Specifically, even if cells having the same internal resistance are discharged using the same equipment, the voltage values of the cells will vary more or less according to the time elapsed after completion of the discharge (see the measurement time a1 and the measurement time a2 for the substance B in FIG. 6). There are some other reasons for the variations in the voltage values, examples of which include the difference in the discharge equipment used (the difference in wiring resistance etc.) and the difference in environmental conditions (the difference in temperature, humidity etc.).

In addition, the individual cells 1 have different internal resistances. If their internal resistances vary, the voltage values vary because of the relationship represented by V=IR. That is, even if the cells are discharged for the same length of time using the same equipment, the voltage values of the cells will vary inevitably (see the substance A and the substance B at the measurement time a0 in FIG. 6).

Figure 7:
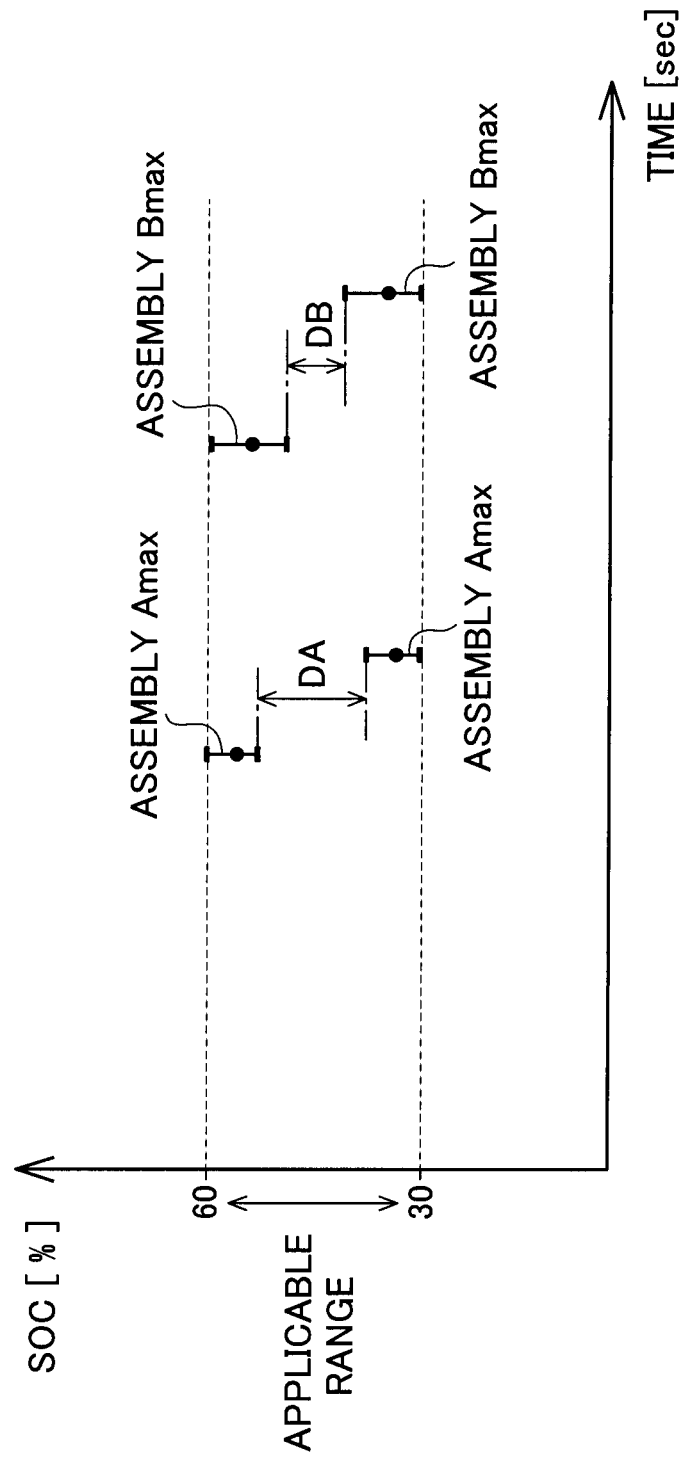
FIG. 7 is a graph showing an appropriate applicable range of the assembled battery of the embodiment.

The above-described variations in the voltages of the cells 1 that constitute the cell stack 90 may cause a decrease in the performance and service life of the assembled battery 100. For instance, the assembled battery 100 is controlled such that the SOC of each cell 1 falls within the applicable range. FIG. 7 shows a control range for an assembled battery (assembly A) having small variations in the voltages of the cells 1 and a control range for an assembled battery (assembly B) having large variations in the voltages of the cells 1. The plots of FIG. 7 represent the respective ranges of the variations in the voltages of the cells of the assembled batteries. In cases where the assembled battery A is operated within its associated control range, the variations are at maximum in the region "assembly Amax" and at minimum in the region "the assembly Amin". In cases where the assembled battery B is operated within its associated control range, the variations are at maximum in the region "assembly Bmax" and at minimum in the region "the assembly Bmin". As seen from FIG. 7, the degree of freedom of the assembled battery B is lower than that of the assembled battery A (DB<DA) when the assembled batteries A and B are operated in the SOC applicable range. For this reason, frequent charging and discharging is required in order to make the SOC fall within the applicable range, which makes the control operation complicated and accelerates degradation.

Turning back to FIG. 4 to explain the assembled battery, after the formation of the cell stack 90 at Step S04, the cells 1 of the cell stack 90 are discharged such that their SOC changes from 40% to 30% (Step S05). Specifically, all the cells 1 are adjusted to the same SOC at the same time, using the same equipment in the same environment. In this way, the voltages of the cells 1, which constitute the cell stack 90, are equalized.

Figure 8:
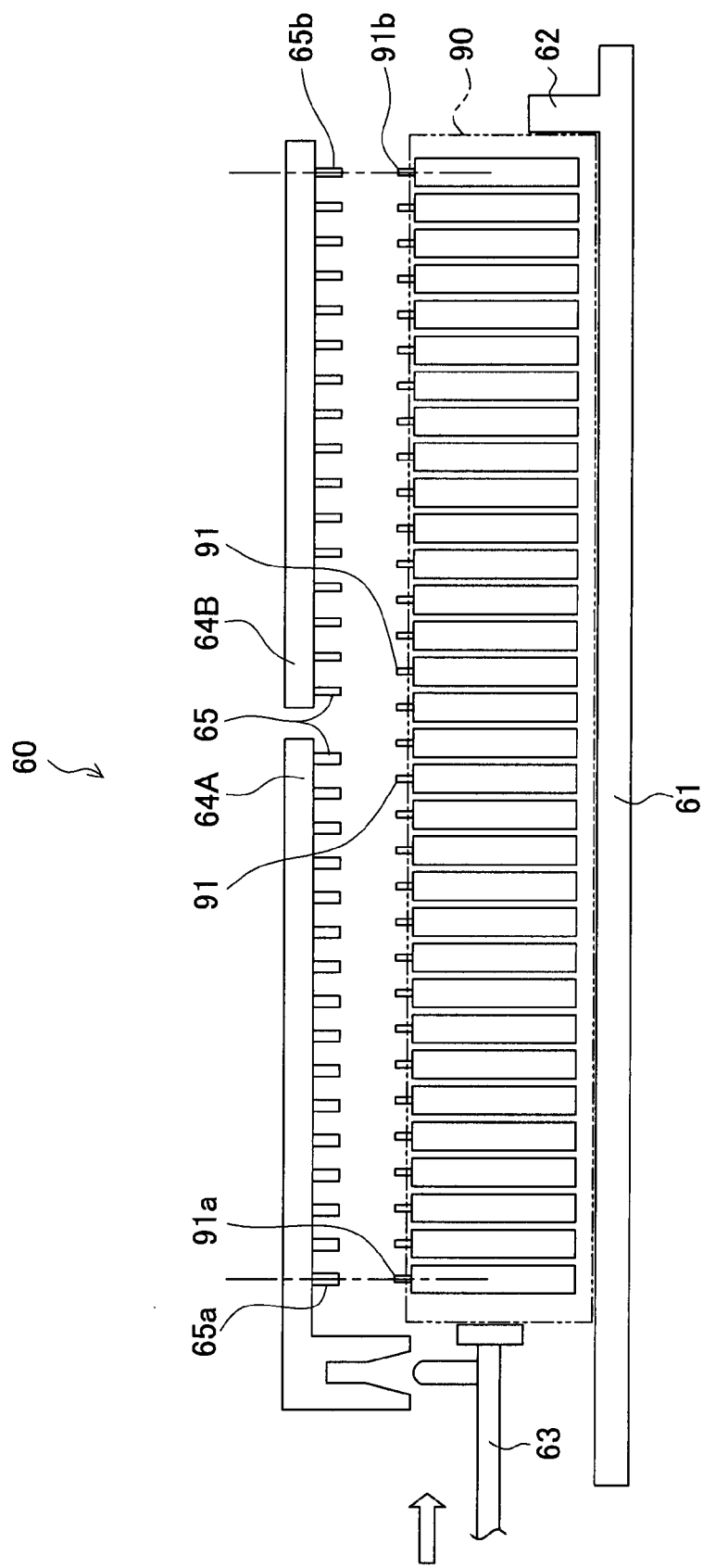
FIG. 8 is a schematic configuration view of a discharge device of the embodiment.

Next, a discharge device for collectively discharging the cell stack 90 will be explained. As shown in FIG. 8, the discharge device 60 according to this embodiment has a worktable 61 on which a workpiece 90 (the cell stack 90) is placed; a rib 62 that projects from the top face (i.e., the face on which the workpiece 90 is placed) of the worktable 61; a pressing member 63 for pressing the workpiece 90 placed on the worktable 61 against the rib 62 thereby to fix the workpiece 90; and contactor tables 64A, 64B on which a plurality of contactor sections 65 are arranged at regular intervals and which are disposed so as to be freely movable in a vertical direction and a lateral direction in FIG. 8 and in a direction perpendicular to the plane of the drawing of FIG. 8.

More specifically, the contactor tables 64A, 64B are located on the right side and left side, respectively, with respect to the pressing direction of the pressing member 63 (the pressing direction is equal to the lateral direction in FIG. 8, and the side where the pressing member 63 is located is herein referred to as "left side" whereas the side where the rib 62 is located is herein referred to as "right side"). The contactor sections 65 arranged on the contactor tables 64A, 64B are opposed to terminals 91 (the positive terminals 21A and the negative terminals 31A) of the workpiece 90, projecting from the under surfaces of the contactor tables 64A, 64B. The contactor section 65a situated at the left side of the contactor table 64A is positioned such that its location is coincident with the location of the terminal 91a of the cell 1 situated at the left side of the workpiece 90 with respect to the lateral direction and the direction perpendicular to the plane of the drawing. The contactor section 65b situated at the right side of the contactor table 64B is positioned such that its location is coincident with the location of the terminal 91b of the cell 1 situated at the right side of the workpiece 90 with respect to the lateral direction and the direction perpendicular to the plane of the drawing.

The provision of the plurality of split contactor tables has the following advantages over use of an unsplit contactor table. Specifically, use of an unsplit contactor table causes a significant increase in the influence of variations in the length of the cell stack 90 in the stacking direction D1. For instance, when the terminal 91b at the right end is regarded as a reference position in the case of the unsplit contactor table, the distance from the reference position to the terminal 91a at the let end that is the furthest from the reference position is long. Therefore, if variations in stack length are significant, positioning relative to the respective terminals 91 becomes difficult. Conversely, in the case of the split contactor tables such as used in this embodiment, the distance between the reference position and the furthest terminal 91 is short, compared to the case of the unsplit contactor table. Therefore, positioning relative to the terminals 91 is easy, which enables it to avoid contact failure.

Figure 9:
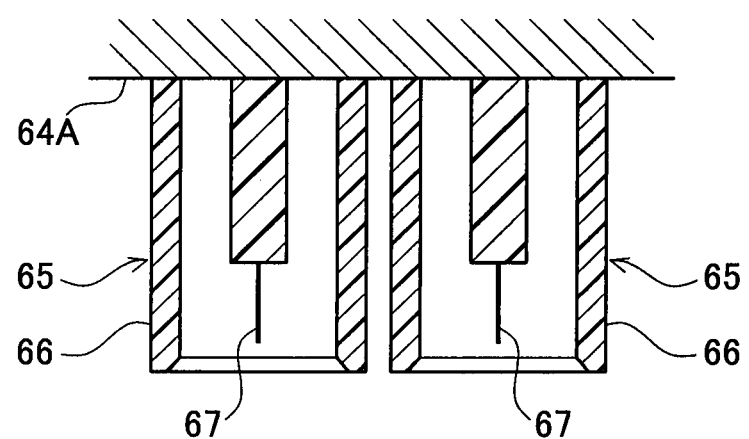
FIG. 9 is a schematic configuration view of a contactor and its surroundings in the discharge device of the embodiment.

As shown in FIG. 9, each contactor section 65 has a contactor 67 housed in a tubular guide section 66. The guide section 66 is open at the end opposed to the workpiece 90 and the diameter of the opening is designed such that the associated terminal 91 of the workpiece 90 can be housed in the guide section 66. The terminal 91 of the workpiece 90 is guided by the guide section 66 so that it can be smoothly connected to the associated contactor 67 of the discharge device.

Turning back to FIG. 4 to explain the assembled battery, after the collective discharge at Step S05, the cells 1 are electrically connected in series by use of the bus bars 50, 51, whereby the assembled battery 100 is formed (Step S06). The serial connection of the cells 1 at Step S06 may be done just after the collective discharge at Step S05 or just before delivery or installation in a vehicle.

In the manufacturing method for the assembled battery 100 of this embodiment, the cells 1 are individually discharged (this discharge is performed at Step S03 and hereinafter called "discharge before assembling"), and after assembling these cells, they are again discharged (this discharge is performed at Step S05 and hereinafter called "collective discharge"). The SOC to which the cells 1 are adjusted by the collective discharge is equal to the minimum applicable percentage within the applicable range. It should be noted that the minimum applicable percentage stated herein does not necessarily mean the exact minimum applicable percentage but may be greater than the exact minimum applicable percentage as long as it is proximate thereto. In view of, for instance, a drop in voltage due to self-discharge or the like, the SOC may be adjusted to a value slightly greater than the exact minimum applicable percentage.

[Setting Example of SOC]

Next, a setting example of SOC will be explained. A target SOC (or voltage value) after the discharge before assembling is determined based on a target SOC (or voltage value) after the collective discharge. Specifically, the change in voltage caused by the collective discharge (i.e., the amount of discharge in the collective discharge) is set to a value greater than a total (X+Y+Z) of the amount of voltage variations X that appear after the discharge before assembling, the amount of voltage variations Y (<X) that appear after the collective discharge and the change in voltage Z caused by self-discharge during the time between the discharge before assembling and the collective discharge.

Suppose that, in the assembled battery of this embodiment, the voltage of the battery when the SOC of the battery is 30% which is equal to the minimum applicable percentage is 3.500V, the amount of voltage variations X appearing after the discharge before assembling is ±0.025V, the amount of voltage variations Y appearing after the collective discharge is 0.005V, and the change in voltage Z caused by self-discharge during the time between the discharge before assembling and the collective discharge is 0.010V. In this case, the total value (X+Y+Z) is 0.070V. Therefore, the voltage that should be obtained after the discharge before assembling may be set to 3.570V or more. In this embodiment, the target value after the discharge before assembling is set to 3.600V (which is 40% when converted into SOC).

Figure 10:
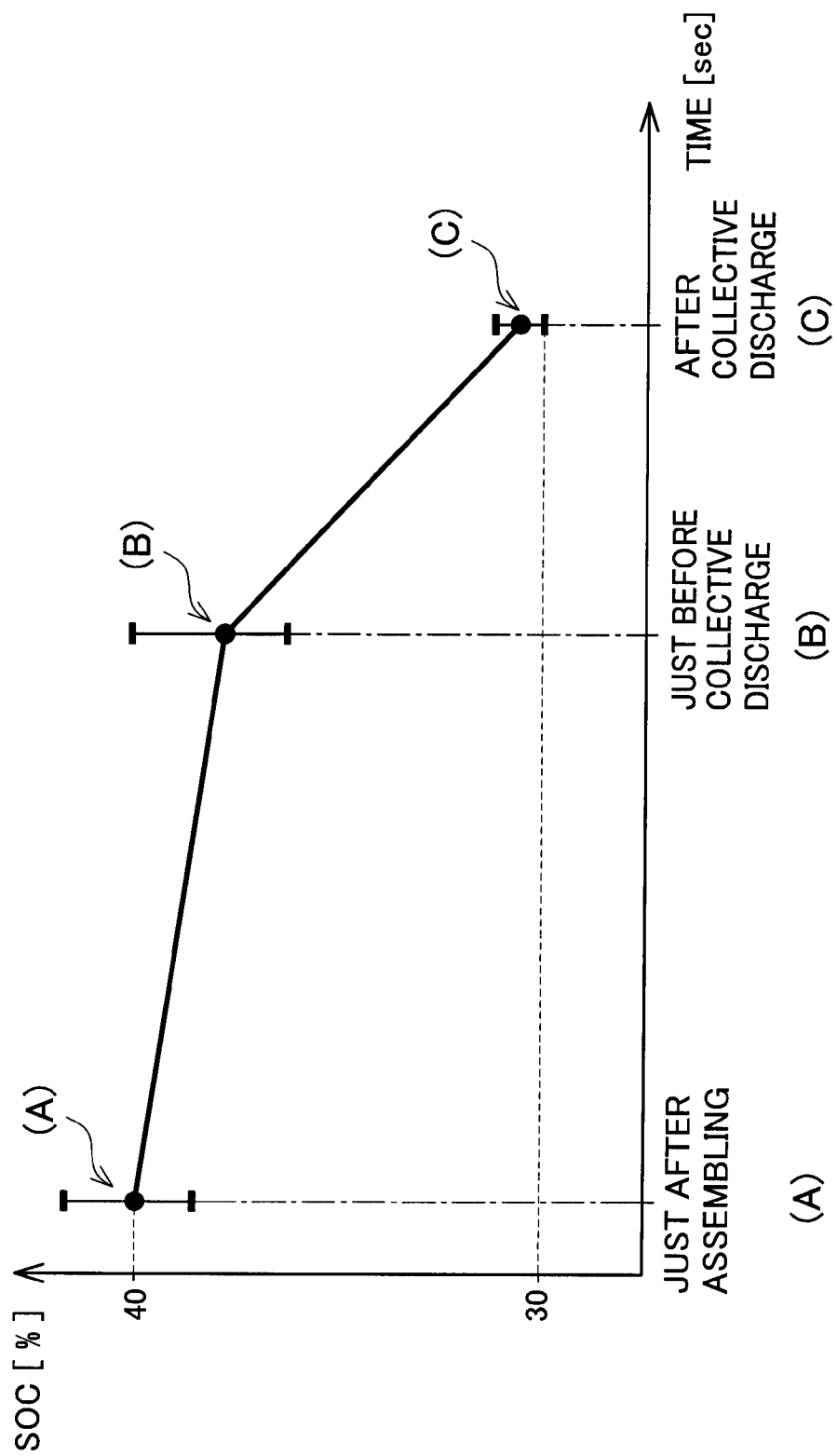
FIG. 10 is a graph showing a voltage transition while the cells of the embodiment are discharged.
Figure 11:
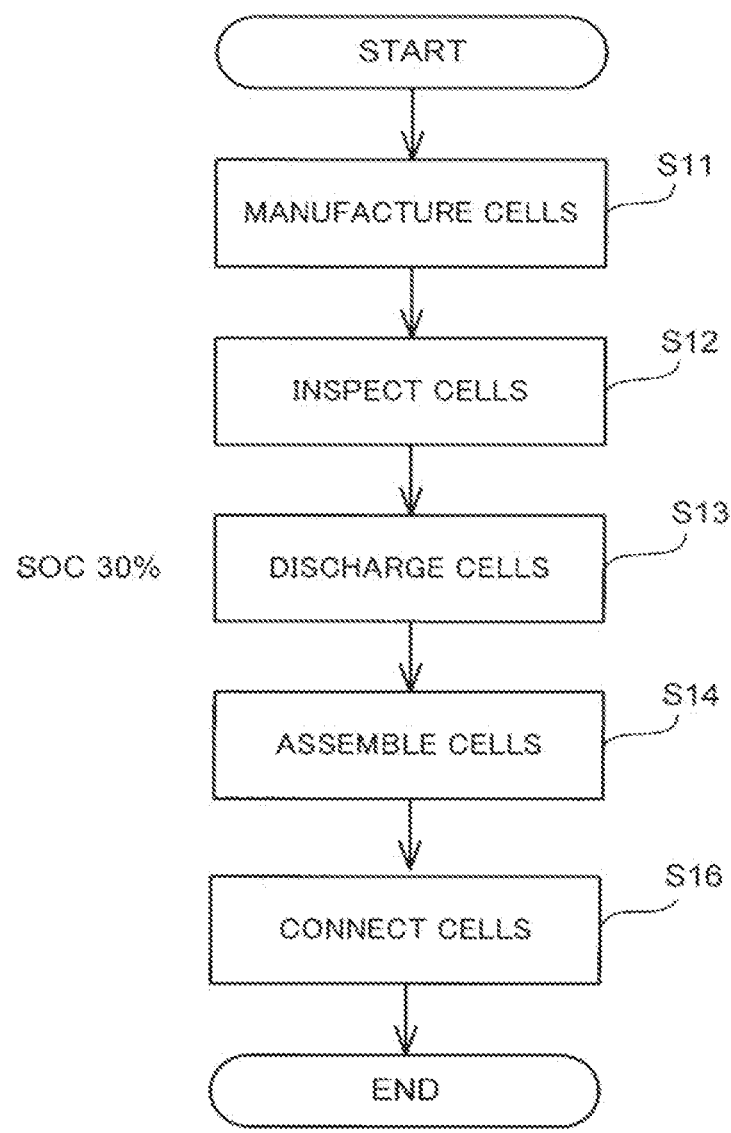
FIG. 11 is a flowchart showing a process of manufacturing an assembled battery in a prior art.

FIG. 10 shows the transition of the voltage variations which appeared between the cells 1 while the discharge before assembling and the collective discharge were performed. Mark (A) in FIG. 10 represents the voltage variations that appeared just after the cells 1 had been assembled into a cell stack 90. In this stage, the SOC of the cells 1 was 40% and the voltage variations were ±0.025V. After assembling, the cells 1 were left to stand for 20 days thereby to promote self-discharge of the cells 1. Mark (B) in FIG. 10 represents the voltage variations that appeared between the cells 1 after 20 days had elapsed and before the collective discharge was performed. Owing to this self-discharge, the voltages of the cells 1 dropped by about 0.010V. Thereafter, the cells 1 were collectively discharged until their SOC became 30%. Mark (C) in FIG. 10 represents the voltage variations that appeared between the cells 1 just after the collective discharge was performed. Thanks to this collective discharge, the voltage variations between the cells 1 were shrunken and reduced to 0.005V.

As has been described, in the manufacturing method for the assembled battery 100 according to this embodiment, after the SOC of the cells 1 is once adjusted to 40% (which is one example of the first charging rate), the cells 1 having SOC 40% are assembled thereby to form the cell stack 90. In this stage, the variations in voltage between the cells 1 are significant. The plurality of cells 1 that constitute the cell stack 90 are collectively discharged while being in an assembled state as the cell stack 90, whereby their SOC is adjusted to 30% (which is one example of the second charging rate). The same discharging conditions (equipment, time, environment, etc.) can be established for the cells 1 by collectively discharging the plurality of cells 1 assembled as the cell stack 90. In consequence, the variations in voltage between the constituent cells 1 of the cell stack 90 can be reduced. In addition, the voltages of the cells 1 are thus equalized by discharging and therefore a power source required for charging is unnecessary in this embodiment. In addition, the SOCs of the cells 1 after the collective discharge are equally adjusted to the minimum applicable percentage, and therefore safety can be ensured during storage and delivery of the cells 1.

It is apparent that the embodiment shown herein is construed as illustrative only and does not limit the scope of the invention in any way. Therefore, it should be naturally understood that the details of the embodiment may be modified or varied substantially without departing from the spirit of the invention. For instance, while the invention has been particularly discussed in the context of a lithium ion battery in the foregoing embodiment, it is equally applicable to other types of batteries. More specifically, the cells employed in the invention could be nickel hydride cells, nickel cadmium cells or the like as long as they are chargeable and dischargeable secondary cells. In addition, the invention is applicable not only to assembled batteries mounted in vehicles but also to assembled batteries for use in home electric appliances.

Although the adjustment of the SOC of each individual cell 1 prior to the assembling at the Step S03 is done by discharging in the foregoing embodiment, it may be carried out by charging according to need as long as the SOC of each cell 1 can be adjusted to a specified value.

While the SOC (the first charging rate) after the discharge before assembling is set to 40% and the SOC (the second charging rate) after the collective discharge is set to 30% in the foregoing embodiment, the SOC values are not limited to these values but may be properly set according to the configuration of the cells 1. It is desirable taking safety aspect into account to set the first charging rate to a value less than or equal to the intermediate value of the applicable SOC range.

Although all the cells 1 that constitute the cell stack 90 (the assembled battery 100) are collectively discharged in the foregoing embodiment, they may be divided into a plurality of groups and the discharge may be performed on a group basis. Specifically, by discharging at least two cells 1 at a time, the voltages of these cells 1 can be equalized. It is, of course, more preferable to collectively discharge all the cells 1 when equalizing the voltages of the cells 1 within the assembled battery 100.

DESCRIPTION OF THE REFERENCE SIGNS

1 Cell
2 Positive electrode plate
3 Negative electrode plate
50, 51 Bus bar
10 Power generating element
90 Cell stack
100 Assembled battery

The invention claimed is:

1. A method of manufacturing an assembled battery including a plurality of cells, the method comprising:
adjusting charging rates of the cells to a first charging rate;
assembling the plurality of cells, the charging rates of which have been adjusted to the first charging rate, such that the cells constitute an electrically unconnected cell stack; and
a second adjustment step for collectively discharging at least two constituent cells of the cell stack such that their charging rates become equal to a second charging rate that is lower than the first charging rate, wherein during the second adjustment step the cells of the cell stack are not electrically connected to one another via any bus bars.

2. The method of manufacturing an assembled battery according to claim 1, wherein the second adjustment step includes collectively discharging all the constituent cells of the cell stack such that their charging rates become equal to the second charging rate.

3. The method of manufacturing an assembled battery according to claim 2, wherein the second charging rate is a lower limit of an applicable range for the cells.

4. The method of manufacturing an assembled battery according to claim 3, wherein an amount of a change in voltage caused by the discharge at the second adjustment step is greater than an amount of variations in voltage between the cells before the discharge.

5. The method of manufacturing an assembled battery according to claim 3, wherein an amount of a change in voltage caused by the discharge at the second adjustment step is greater than a value obtained by adding an amount of a change in voltage that appears just after the formation of the cell stack at the assembling step to an amount of variations in voltage between the cells before discharge.

6. The method of manufacturing an assembled battery according to claim 3, wherein an amount of a change in voltage caused by the discharge at the second adjustment step is greater than a value obtained by further adding an amount of variations in voltage after the collective discharge of the cells to an amount of variations in voltage between the cells before discharge and an amount of a change in voltage that appears just after the formation of the cell stack at the assembling step.

7. The method of manufacturing an assembled battery according to claim 2, wherein an amount of a change in voltage caused by the discharge at the second adjustment step is greater than an amount of variations in voltage between the cells before the discharge.

8. The method of manufacturing an assembled battery according to claim 2, wherein an amount of a change in voltage caused by the discharge at the second adjustment step is greater than a value obtained by adding an amount of a change in voltage that appears just after the formation of the cell stack at the assembling step to an amount of variations in voltage between the cells before discharge.

9. The method of manufacturing an assembled battery according to claim 2, wherein an amount of a change in voltage caused by the discharge at the second adjustment step is greater than a value obtained by further adding an amount of variations in voltage after the collective discharge of the cells to an amount of variations in voltage between the cells before discharge and an amount of a change in voltage that appears just after the formation of the cell stack at the assembling step.

10. The method of manufacturing an assembled battery according to claim 1, wherein the second charging rate is a lower limit of an applicable range for the cells.

11. The method of manufacturing an assembled battery according to claim 10, wherein an amount of a change in voltage caused by the discharge at the second adjustment step is greater than an amount of variations in voltage between the cells before the discharge.

12. The method of manufacturing an assembled battery according to claim 10, wherein an amount of a change in voltage caused by the discharge at the second adjustment step is greater than a value obtained by adding an amount of a change in voltage that appears just after the formation of the cell stack at the assembling step to an amount of variations in voltage between the cells before discharge.

13. The method of manufacturing an assembled battery according to claim 10, wherein an amount of a change in voltage caused by the discharge at the second adjustment step is greater than a value obtained by further adding an amount of variations in voltage after the collective discharge of the cells to an amount of variations in voltage between the cells before discharge and an amount of a change in voltage that appears just after the formation of the cell stack at the assembling step.

14. The method of manufacturing an assembled battery according to claim 1, wherein an amount of a change in voltage caused by the discharge at the second adjustment step is greater than an amount of variations in voltage between the cells before the discharge.

15. The method of manufacturing an assembled battery according to claim 1, wherein an amount of a change in voltage caused by the discharge at the second adjustment step is greater than a value obtained by adding an amount of a change in voltage that appears just after the formation of the cell stack at the assembling step to an amount of variations in voltage between the cells before discharge.

16. The method of manufacturing an assembled battery according to claim 1, wherein an amount of a change in voltage caused by the discharge at the second adjustment step is greater than a value obtained by further adding an amount of variations in voltage after the collective discharge of the cells to an amount of variations in voltage between the cells before discharge and an amount of a change in voltage that appears just after the formation of the cell stack at the assembling step.

* * * * *